W. Evans,

Milling Metals;

No. 108,013.    Patented Oct. 4, 1870.

William Evans
Inventor
By his Attorney,

United States Patent Office.

WILLIAM EVANS, OF NEW HAVEN, CONNECTICUT.

Letters Patent No. 108,013, dated October 4, 1870.

IMPROVEMENT IN MACHINES FOR MILLING CARRIAGE-SPRING HEADS.

The Schedule referred to in these Letters Patent and making part of the same.

*To all whom it may concern:*

Be it known that I, WILLIAM EVANS, of New Haven, in the county of New Haven and State of Connecticut, have invented a new Improvement in Machine for Finishing Carriage-Spring Heads; and I do hereby declare the following, when taken in connection with the accompanying drawings and the letters of reference marked thereon, to be a full, clear, and exact description of the same, and which said drawings constitute part of this specification, and represent in—

Figure 1:
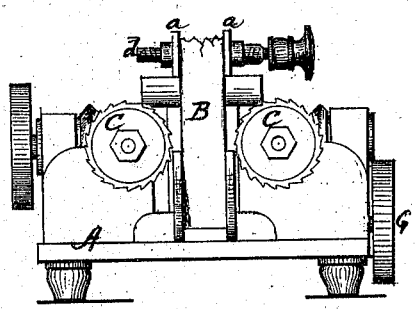
Figure 2:
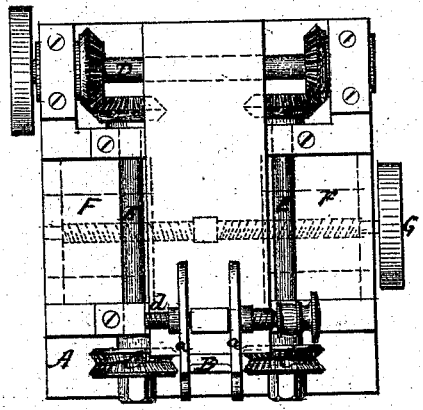
Figure 3:

Figure 1, a front view;
Figure 2, a top view;
Figure 3, the spring-head unfinished; and in
Figure 4, the spring-head finished.

Figure 4:

This invention relates to an improvement in machine for performing that part of the work on carriage-springs known as finishing the heads; that is to say, the ears when welded onto the spring to form the head are left as seen in fig. 3, forming a square shoulder at their intersection with the spring. This requires to be cut away, as seen in fig. 4. Heretofore it has been done by "chipping and filing."

The object of my invention is to perform the labor in a more simple, cheap, and perfect manner; and The invention consists in a clamping device for holding the spring in position, combined with a rotary cutter or cutters, to be brought in contact with that portion of the head or ears to be cut away.

A is the bed of the machine, upon which are supported two jaws, $a$, operated by a right-and-left-hand threaded screw, $d$, so that the jaws separate or approach each other from or toward a common center, so that the spring B is clamped and held in a vertical position between the two jaws, as seen in the drawings.

C C are two cutters, caused to revolve by the application of power to the driving-shaft D, as seen in fig. 2.

The shafts E of the two cutters are arranged in bearings on the slide F, which said slides are moved transversely to the axis of the shafts E by a right-and-left-hand threaded screw, G, as seen in fig. 2, so as to accommodate the cutters to different widths of spring, and, at the same time, to feed the cutters up to cut away the head.

The spring being set between the jaws, as seen in fig. 1, the cutters are brought up when revolving, and so as to cut away the head, finishing the head, as seen in fig. 4.

I claim as my invention—

The combination of the two jaws, $a\ a$, and right-and-left screw $d$, with the two cutters C C and the adjusting-screw G, the whole constructed and arranged in the manner herein set forth.

WILLIAM EVANS.

Witnesses:
A. J. TIBBITS,
JOHN H. SHUMWAY.